(12) United States Patent
Grant et al.

(10) Patent No.: US 7,335,306 B2
(45) Date of Patent: Feb. 26, 2008

(54) CHROMATOGRAPHIC MEDIUM

(75) Inventors: Richard Alasdair Grant, Reading (GB); Francesco Luigi Bernardis, Sonning Common (GB); David Colin Sherrington, Glasgow (GB)

(73) Assignees: Anglo Platinum Limited, Johannesburg (ZA); University of Strathclyde, Glasgow (GB)

( * ) Notice: Subject to any disclaimer, the term of this patent is extended or adjusted under 35 U.S.C. 154(b) by 267 days.

(21) Appl. No.: 10/525,316

(22) PCT Filed: Aug. 7, 2003

(86) PCT No.: PCT/GB03/03467

§ 371 (c)(1),
(2), (4) Date: Nov. 7, 2005

(87) PCT Pub. No.: WO2004/018071

PCT Pub. Date: Mar. 4, 2004

(65) Prior Publication Data

US 2006/0113247 A1 Jun. 1, 2006

(30) Foreign Application Priority Data

Aug. 23, 2002 (GB) ................................ 0219681.4

(51) Int. Cl.
B01D 15/08 (2006.01)

(52) U.S. Cl. .................. 210/635; 210/656; 210/198.2; 423/22

(58) Field of Classification Search .................. 423/22; 210/635, 638, 656, 659, 198.2, 502.1
See application file for complete search history.

(56) References Cited

U.S. PATENT DOCUMENTS

| | | | |
|---|---|---|---|
| 3,745,206 A | 7/1973 | Haluska et al. | |
| 3,985,552 A | 10/1976 | Edwards | |
| 4,479,922 A * | 10/1984 | Haynes et al. | ........... 423/22 |
| 4,696,980 A | 9/1987 | Porath | |
| 4,855,143 A | 8/1989 | Lowey | |
| 4,900,520 A * | 2/1990 | Behnam et al. | ........... 423/22 |
| 4,959,153 A | 9/1990 | Bradshaw et al. | |
| 5,171,546 A | 12/1992 | Guy et al. | |
| 5,318,846 A | 6/1994 | Bruening et al. | |
| 5,879,644 A | 3/1999 | Grant et al. | |

(Continued)

FOREIGN PATENT DOCUMENTS

EP 0 165 912 A2 12/1985

(Continued)

OTHER PUBLICATIONS

Anticó et al., "Adsorption of palladium by glycolmethacrylate chelating resins," *Analytica Chimica Acta*, vol. 296, No. 3, 1994, Oct. 20, 1994, pp. 325-332.

(Continued)

*Primary Examiner*—Ernest G Therkorn
(74) *Attorney, Agent, or Firm*—RatnerPrestia (57) ABSTRACT

A chromatographic medium including thioether ligands bound to a cross-linked polymer matrix. The polymer is an organic polymer and the medium is hydrophilic. A method of manufacturing the media is also described. The media are useful in the chromatographic separation of components from solution, and in particular for the interseparation of platinum group metals.

13 Claims, 4 Drawing Sheets

U.S. PATENT DOCUMENTS

| | | |
|---|---|---|
| 5,942,463 A | 8/1999 | Oscarsson et al. |
| 2001/0029282 A1 | 10/2001 | Duval |

FOREIGN PATENT DOCUMENTS

| | | |
|---|---|---|
| EP | 0 180 563 A2 | 5/1986 |
| EP | 0 355 376 A2 | 2/1990 |
| EP | 0 608 703 A1 | 8/1994 |
| EP | 0 608 703 B1 | 8/1994 |
| GB | 2 151 599 A | 7/1985 |

OTHER PUBLICATIONS

Kukushkin et al., "Sorption of Platinum Metals by Copolymers of Glycidyl Methacrylate and Ethylene Dimethacrylate Modified with Ethylenediamine and Diethylamine," *Journal of Applied Chemistry of the USSR*, Plenum Publishing Co., New York, NY, US, vol. 52, No. 7, Jul. 1979, pp. 1414-1418.

International Preliminary Examination Report, dated Mar. 21, 2005, from International Application No. PCT/GB03/03467.

* cited by examiner

Fig. 8

CHROMATOGRAPHIC MEDIUM

This application is the U.S. national phase application of PCT International Application No. PCT/GB2003/003467, filed Aug. 7, 2003, and claims priority of British Patent Application No. 0219681.4, filed Aug. 23, 2002.

FIELD OF THE INVENTION

This invention concerns chromatographic media, more especially it concerns chromatographic media comprising polymer-supported thioether ligands, methods for their preparation, and their use in the separation of metals, particularly the platinum group metals.

BACKGROUND OF THE INVENTION

Chromatography has been suggested for the interseparation of platinum group metals ("PGM"—platinum, palladium, rhodium, osmium, ruthenium and iridium). The earliest suggestion was in U.S. Pat. No. 4,855,143. However, it was found that the media recommended therein exhibited serious degradation in the concentrated acid necessarily used for solutions of the PGM. Later, U.S. Pat. No. 5,879,644 taught the use of selected commercial media, especially "Toyopearl", for the interseparation of the PGM. These, especially when combined with certain process improvements, provided good separation and beneficial lifetimes however, capacity was found to be low and high volumes of eluant were required leading to increased costs. The chromatographic separation process appears to offer great promise for PGM refining. There remains, however, the need for further improved media, especially for the recovery or separation of palladium. Very many commercial media have been tested but none has exhibited the desired combination of properties namely, increased throughput and good metal separation per unit volume of eluant.

The use of solid phase extraction is commonplace in PGM separation and refining. For example, the use of specified thioethers has been recommended for the extraction of Pd from nitric acid solutions of plutonium arising from the nuclear industry (U.S. Pat. No. 5,171,546). U.S. Pat. No. 4,959,153 proposes the binding of thioether-based materials linked to silica, and we believe that these have been introduced into commercial PGM refining processes and are marketed as "Superlig". Such solid phase extractant materials demonstrate fast binding of Pd but, the use of an inorganic support (silica) means that their capacity is rather low, and tests have shown almost halving of capacity after three month's use.

Sulphur containing groups have been used as cross-linkers to provide solvent stability to polysaccharide and oligosaccharide materials, US 2001/0029282 A1. The cross-linked polymers are useful for the separation of chiral enantiomers.

EP 0 608 703 also relates to materials useful in the separation of mixtures of organic compounds such as racemates. The materials comprise a cyclodextrin species attached to a support via an intermediate group which may be sulphur containing. It is the cyclodextrin species which is active in the separation process.

EP 0 355 376 relates to media for the extraction of metal ions from solution. The media are composed of an inorganic silica support onto which organic sulphur containing groups may be attached.

SUMMARY OF THE INVENTION

In accordance with the present invention, a chromatographic medium comprises thioether ligands bound to a solid cross-linked polymer matrix; wherein the polymer is organic; and wherein the medium is hydrophilic.

BRIEF DESCRIPTION OF THE DRAWINGS

The invention is described below by way of example only and with reference to the following drawings in which.

DETAILED DESCRIPTION OF THE INVENTION

In the present invention, a distinction is drawn between media which have chromatographic function and those which simply absorb species from solution. A chromatographic medium is one which is able to separate one or more species from a mixed solution in a sequential fashion. By way of contrast, a solid phase extraction medium can be used to effectively extract species from solution but has no capacity for separation. For example, the commercial 'Superlig' materials selectively extract and bind one or more species from a mixed solution but they do not separate the species remaining in solution. Complete separation can only be effected by successively passing the mixed solution through a series of different materials, each one tailored to extract and bind a particular species or group of species. Recovery of each species is by elution. Furthermore, the use of an organic polymer support provides the media of the present invention with higher capacity compared to those which use inorganic supports.

Preferably, the polymer comprises methacrylate moieties, styrene moieties, poly(ethylene glycol) moieties or any combination or mixture thereof.

The ligands may be bound to the polymer matrix through a branched or an unbranched group. Suitable groups include alkyl, aryl, aralkyl, ether or ester groups or combination thereof. Such groups may be unsubstituted but are preferably substituted. It is particularly preferred that groups are substituted by hydroxyl groups to improve the hydrophilicity of the medium.

Additionally, the sulphur atom of the thioether group may be substituted by an alkyl group. Suitable alkyl groups may have from 1 to 6, preferably 2 to 4, carbon atoms and are optionally substituted. Hydroxyl groups are particularly preferred as substituents although other groups which promote hydrophilic properties are also suitable.

The ligands used in the present invention may comprise mono-, di- or poly-thioether ligands, with mono-thioether ligands being particularly preferred.

The medium may further comprise additional substituent groups bound to the polymer matrix. These may provide the medium with improved hydrophilicity. Examples of suitable ligands include water soluble groups, or groups which can interact with water via hydrogen bonding, such as poly-ethylene glycols, poly-propylene glycols, hydrophilic poly-acids and poly-ether, -ester or -hydroxy species.

The medium may be in any solid form however, preferably the medium is in the form of a gel or a porous solid. Beads, films and fibres are preferred.

A particular advantage of the media of the present invention is that they do not degrade significantly in strong acid solutions. This makes them suitable for use in the recovery of PGM from hydrochloric acid solutions.

The polymer matrix may be pre-formed or may be synthesised during the formation of the medium, and the matrices may be cross-linked to a lesser or greater extent. Low levels of cross-linking, of the order of 1-10%, produce a gel-type product, whereas higher levels of cross-linking, e.g. of the order of 50-70% or even higher, used in combination with a suitable porogen (pore former) produce a rigid material. Porogens are known in the art and include species such as water and xylene. Such rigid materials do not exhibit gel-type swelling in aqueous media but, will readily sorb aqueous solutions into the permanent pore structure without significant volume swelling. The polymers preferably incorporate methacrylate and/or styrene moieties. When glycidyl methacrylate resins are used as precursor resins, at least one hydroxyl group is desirably present on the reactive thiol such that at least two hydroxyl groups are present after the reaction between the thiol and glycidyl group.

It is considered that the presence of poly(ethylene glycol) groups is particularly beneficial to the rate of uptake of Pd from HCl solutions.

Structural representations of some examples of media according to the present invention are shown in Table 1.

TABLE 1

| Code | Structural representation | Polymer matrix |
|---|---|---|
| FB131 | HO~S~O-C(O)-●-C(O)-O~OH | methacrylate |
| FB138 | O~S~O-C(O)-●-C6H4-CH2-(O~)45-O~ | methacrylate-costyrene |
| FB143 | ●-C(O)-O~CH(OH)~S~OH | methacrylate |

TABLE 1-continued

| Code | Structural representation | Polymer matrix |
|------|---------------------------|----------------|
| FB190 | ●—C(=O)—O—CH₂—CH(OH)—CH₂—S—CH₂—CH(OH)—CH₂—OH | methacrylate |
| FB194b | ●—C₆H₄—O—CH₂CH₂—S—CH₂CH₂—OH | styrene |
| FB205 | ●—C₆H₄—CH₂—S—CH₂—CH(OH)—CH₂—OH | styrene |
| FB206 | ▨—C₆H₄—CH₂—S—CH₂—CH(OH)—CH₂—OH | styrene |
| FB173 | ●—C(=O)—O—CH₂—CH(OH)—CH₂—S—CH₂CH₂—S—CH₂CH₂—OH | methacrylate |
| FB202 | ●—C(=O)—O—CH₂—CH(OH)—CH₂—S—CH₂CH₂—O—CH₂CH₂—S—CH₂CH₂—OH | methacrylate |

● = porous-type resin

▨ = gel-type resin

The present invention also provides a method of manufacturing a chromatographic medium comprising reacting a functionalised thioether monomer with a hydrophilic monomer in the presence of a cross-linking agent. Suitable cross linking agents are known in the art and include species such as 3-(acryloyloxy)-2-hydroxypropyl methacrylate, glycerol dimethacrylate, ethylene glycol dimethacrylate and poly(ethylene glycol) dimethacrylate.

In an alternative embodiment, a method of manufacturing a chromatographic medium comprises reacting a thiol with a functionalised polymer.

The method of the invention is illustrated by the following reaction schemes:

-continued

RSH =

Scheme 1
Copolymerisation of a thioether functionalised monomer with hydrophilic monomers.

AMPA = 2,2'-azobis(2-methylpropionamide)dihydrochloride)

Scheme 2
Reaction of thiols with reactive polymers
Reaction with Macroprep Epoxide™ [poly(glycidyl methacrylate-co-ethylene glycol dimethacrylate)]
Surface area of Macroprep Epoxide™ = 18 m$^2$ · g (N$_2$ BET)
Loading capacity of Macroprep Epoxide™ = 4 mmol epoxide/g Scheme 3a
Reaction with poly(vinylbenzyl chloride-co-divinylbenzene) resins:
Gel type resin (2% X-linked) 5.9 mmol/gCl Scheme 3b
High surface area resin (62.5% X-linked) 2.1 mmol Cl/g
Surface area = 350 m$^2$/g (N$_2$ BET)

The method of the invention may be carried out by the skilled polymer chemist using conventional techniques and conditions.

The medium may be contained within the pores of a porous support to form a composite chromatographic medium. For example, the polymer matrix may be formed within the pores of a silica gel support which is then functionalised with thioether ligands. Alternatively, a functionalised thioether monomer may be reacted to form the polymer within the pores of a support. In either case, the thioether ligands are still bound to the organic polymer matrix and not to the porous support. Any porous support may be used, some examples including inorganic materials such as silica, and other oxide materials, and organic porous materials such as polystyrene.

The invention further provides a process for the separation of components from solution, comprising passing said solution over a chromatographic medium according to the invention. Preferably, the solution is a solution comprising a PGM or several of them, e.g. in admixture with a proportion of base metals, especially a solution containing Pd. Such solutions may be PGM refinery streams, side-streams or other solutions containing Pd including so-called secondary refining streams arising from the recycling or recovery of used catalysts or other materials.

In a particularly preferred embodiment, the solution to be separated comprises Pd together with other PGM and/or base metals. Conventionally, it is difficult to use chromatography to obtain substantially pure Pd from a mixed PGM solution at high metal loading. This is because as metal loading increases the elution peaks for Pd and Pt overlap. A further process step is thus required, leading to increased costs and plant space. The present invention overcomes this problem by simultaneously retaining Pd whilst chromatographically separating other metals. Only a single process step is required even at high metal loadings Although the media of the invention are considered to offer particular advantages in the treatment of Pd-containing solutions, they are not to be considered as limited thereto.

Some preparative routes to yield the media of the invention are described below. The routes described are illustrative and as such, are not intended to limit the scope of the present invention. Alternative synthetic strategies will be known to those skilled in the art

EXAMPLE 1

Preparation of vinylbenzyl poly(ethylene glycol) 2000 Methyl Ether

A 1.0 M solution of potassium tert-butoxide in 2-methyl-2-propanol (375 ml; 0.375 mol) was added to a solution of poly(ethylene glycol) monomethyl ether av. $M_w$=2000 (598 g; 0.299 mol) in ThF (1000 ml). The solution was stirred for 30 minutes at ambient temperature. Vinylbenzyl chloride (65 g; 0.426 mol) was added to the solution which was stirred at 45° C. for 16 hrs. The solution was neutralised with acetic acid (1 ml) and hydroquinone (0.1 g) was added prior to reducing the volume to 700 ml by vacuum distillation at 55° C. The concentrated solution was then added to diethyl ether (1000 ml) and kept at 4° C. for 16 hrs. The precipitates thus formed were filtered and washed with diethyl ether and n-hexane and dried on a rotary evaporator at 50° C. The organic-soluble products were extracted in acetone at 50° C. and separated by filtration through a sintered glass frit (P3) with the aid of Celite™. Vinylbenzyl poly(ethylene glycol) 2000 methyl ether (548 g; 259 mol; 87% yield) was recovered from the acetone solution after drying at 57° C. under vacuum for 2 hrs. The molten VBPEG 2000 me was poured into a 40×20 cm stainless steel tray and allowed to solidify before processing into small (4×10×10 mm) blocks.

EXAMPLE 2

Preparation of thiodiethanol monomethacrylate (TDEMA)

A solution of methacryloyl chloride (16.7 g; 0.160 mol) in dichloromethane (100 ml) was added dropwise at 5° C. to a solution of thiodiethanol (20 g; 0.164 mol) and triethylamine (33.7 g; 0.334 mol) in dichloromethane (50 ml). After addition was complete, the solution was stirred at ambient temperature for 16 hrs. The excess triethylamine was neutralised with glacial acetic acid and the volume reduced on a rotary evaporator. The soluble organic products were extracted in diethyl ether and separated by filtration. Thiodiethanol monomethacrylate was purified by preparative flash chromatography, using silica gel (eluant=1:1 diethyl ether:hexane). Fractions containing pure product were collected and combined to yield thiodiethanol monomethacrylate (8.5 g; 0.044 mol, 28% yield) as a light coloured oil. Several attempts at distillation of TEDMA at reduced pressure and in the presence of excess stabiliser resulted in rapid polymerisation of the monomer. Thiodiethanol monomethacrylate was stored at 4° C. in the presence of 100 ppm 3,5-di-tert-butylcatechol.

EXAMPLE 3

Preparation of 2-(2-mercapto-ethylsulfanyl) ethanol 1,2-Ethane dithiol (20.79 ml; 0.248 mol) was added to a solution of sodium hydroxide (9.92 g; 0.248 mol) in ethanol (200 ml) and stirred for 15 min. 2-Chloroethanol (16.65 ml; 0.248 mol) was added to the solution at ambient temperature and after addition was complete the solution was heated to 80° C. and stirred for 2 hrs. The reaction mixture was then cooled to ambient temperature and a small amount of acetic acid (1 ml) added to neutralise the solution. The insoluble sodium chloride was separated by filtration and the filtrate transferred to a distillation apparatus. Ethanol and unreacted 1,2-ethane dithiol were removed under reduced pressure prior to the fractional distillation of 2-(2-mercapto-ethylsulfanyl) ethanol at 98° C. and 0.4 mbar. Pure fractions were combined to afford 2-(2-mercapto-ethylsulfanyl) ethanol (13.8 g; 0.1 mol; 40% yield) as a colourless liquid possessing a mild stench.

EXAMPLE 4

Preparation of monotetrahydropyranyl thiodiethanol

A solution of 3,4-dihydro-2 H-pyran (10 g; 0.118 mol) in dichloromethane (10 ml) was added dropwise to a solution of thiodiethanol (14.5 g; 0.118 mol) and PTSA (0.01 g) in dichloromethahe (10 ml) at room temperature. After stirring for 2 hrs triethylamine (0.1 ml) was added to neutralise the acid catalyst. The organic phase was washed with aqueous 0.1% NaOH (50 ml). Distillation of the organic phase at 99° C. and 0.07 mbar resulted in a mixture of the di- and mono-protected acetals. Purification by flash chromatography using diethylether: hexane (1:1) afforded monotetrahydropyranyl thiodiethanol (7.2 g; 0.035 mol; 30% yield) as a light yellow oil.

EXAMPLE 5

Preparation of 2-[2-(2-mercapto-ethoxy)-ethylsulfanyl]-ethanol

2-Mercaptoethyl ether (53.8 ml; 0.434 mol) was added to a solution of sodium hydroxide (17.36 g; 0.434 mol) in ethanol (300 ml) at ambient temperature and stirred for 15 min. 2-Chloroethanol (29.1 ml; 0.434 mol) was added to the solution at ambient temperature and after addition was complete the stirred solution was heated to 80° C. for 1 hr. The reaction mixture was then cooled to ambient temperature and the solid sodium chloride separated by filtration. The filtrate was transferred to a distillation apparatus and ethanol and unreacted 2-mercaptoethyl ether removed under vacuum (the latter distilling at 62° C. and 0.4 mbar). Fractional distillation of the remaining product yielded 2-[2-(2-mercapto-ethoxy)-ethylsulfanyl]-ethanol at 128° C. and 0.3 mbar. Pure fractions were combined to afford 2-[2-(2-mercapto-ethoxy)-ethylsulfanyl]-ethanol (31 g; 0.17 mol; 39% yield) as a colourless oil.

EXAMPLE 6

Reaction of thiols with Macroprep Epoxide®

The reaction of thiols with Macroprep Epoxide® was carried out under basic conditions using a 1.0 M solution of potassium tert-butoxide in 2-methyl-2-propanol as base. The ratio of base:thiol:resin was varied for the series of thiols used and the ratios are presented along with other reaction conditions in Table 2. The 1.0 M solution of potassium tert-butoxide was added to a solution of the thiol in methanol:THF (1:1). This solution was added to a slurry of the previously dried resin in methanol:THF (1:1) at ambient temperature. The slurry was stirred by means of an overhead stirrer from 16 to 48 hr at various temperatures. The reaction mixture was then cooled to ambient temperature, filtered and washed successively with methanol aqueous acetic acid, water, acetone and finally diethyl ether. The resin was dried at 70-80° C. under vacuum for at least 2 hrs.

TABLE 2

Stoichiometries and reaction conditions for the reaction of thiols with Macroprep Epoxide®

| Resin Code | Thiol | Mol Ratio base:thiol:resin | Reaction Temp. (° C.) | Reaction Time (hrs) | Resin: Solvent Ratio (g:ml) |
|---|---|---|---|---|---|
| FB143 | HS~~~OH | 1:1.4:0.64 | 45 | 48 | 1:7.5 |
| FB173 | HS~~~S~~~OH | 1:2.5:2 | 50 | 24 | 1:8 |
| FB190 | HS~~~(OH)~~~OH | 1:4.2:3.2 | 45 | 16 | 1:6.3 |
| FB191 | HS~~~ | 1:4.2:3.2 | 45 | 16 | 1:6.3 |

TABLE 2-continued

Stoichiometries and reaction conditions for the reaction of thiols with Macroprep Epoxide®

| Resin Code | Thiol | Mol Ratio base:thiol:resin | Reaction Temp. (° C.) | Reaction Time (hrs) | Resin:Solvent Ratio (g:ml) |
|---|---|---|---|---|---|
| FB192 | HS—⌬ (phenyl) | 1:3.3:2.5 | 45 | 16 | 1:7 |
| FB202 | HS—CH₂CH₂—O—CH₂CH₂—S—CH₂CH₂—O— | 1:7.5:6.3 | 45 | 24 | 1:7.8 |
| FB204 | HS—CH₂CH(CH₃)₂ | 1:27:4.8 | ambient | 18 | 1:6.7 |

EXAMPLE 7

Preparation of FB131 and FB138 by Inverse Suspension Polymerisation

The continuous phases for the inverse suspension polymerisations (ISP) were prepared by dissolving the ethyl ester of a maleic anhydride-co-octadecene copolymer Mw 50 000 (Et-MAO) in liquid paraffin (LP) or mixtures of liquid paraffin and cyclohexane. In cases where only the former solvent was used heating at 140-160° C. with continuous stirring for 1 hr was required to obtain complete dissolution of the stabiliser. All solutions were cooled to room temperature before addition to the suspension polymerisation reactor. The continuous phases were degassed inside the sealed reactor by bubbling nitrogen through the solutions at 65° C. for 1 hr. The monomer phases were kept under nitrogen for 5 min. prior to addition to the continuous phases at 42° C. Suspensions were formed by stirring the two phases at around 300 rpm for a period of 10-15 min. and thereafter the temperature was increased to 65° C., with continuous stirring for 6 hrs. The resins were then filtered, washed with hexane, and extracted in a Soxhlet apparatus with acetone for 16 hrs. Finally the resins were washed with diethyl ether before being vacuum dried. The monomer phase compositional data and inverse suspension polymerisation conditions for FB131 and FB138 are presented in Tables 3 and 4.

TABLE 3

Monomer phase composition data for FB131 and FB 138

| Resin Code | Mass (g) TDEMA | Mass (g) HEMA | Mass (g) VBPEG 2000 me | Mass (g) GDMA | Mass (g) AMPA | Mass (g) H₂O | Mass (g) Ethylene glycol |
|---|---|---|---|---|---|---|---|
| FB131 | 4.38 | 7.0 | — | 0.36 | 0.13 | 0.50 | 5.0 |
| FB138 | 2.8 | — | 4.88 | 0.5 | 0.09 | 0.35 | 3.5 |

(HEMA = hydroxy ethyl methacrylate; VBPEG = vinyl benzyl polyethylene glycol; GDMA = glycol dimethacrylate)

TABLE 4

Conditions used in the ISP of FB131 and FB 138

| Resin Code | Continuous phase | Stirrer speed (rpm) | Yield isolated (%) |
|---|---|---|---|
| FB131 | Et-MAO (0.4 g)/LP (150 g)/cyclohexane (70 g) | 268 | 95 |
| FB138 | Et-MAO (0.17 g)/LP (170 g) | 300 | nr |

EXAMPLE 8

Preparation of poly(vinylbenzyl chloride (VBC)-co-styrene-co-divinylbenzene(DVB)) Resin Beads via Suspension Polymerisation A 0.5% aqueous solution of 88% hydrolysed polyvinyl alcohol (700 ml) was introduced into a 1000 ml baffled reaction vessel and allowed to stand under a nitrogen atmosphere for 30 min. Monomer phase (50 ml) containing 1 wt % AIBN was degassed by bubbling nitrogen through the solution for 10 min. The monomer phase was added to the aqueous phase at 20° C. and agitated by means of a propeller type stirrer at an appropriate velocity so as to obtain monomer droplets of approximately 100 μm diameter. After stirring for 20 min at 20° C., the temperature was increased to 80° C. and stirred for a further 6 hrs. The mixture was filtered hot, and washed with water until the washings were clear. The filter was washed with methanol and the resin beads extracted in a Soxhlet apparatus with acetone for 16 hrs. Macroporous resins were dried in a vacuum oven at 40° C. for 16 hrs. Gel-type resins were washed with methanol prior to drying, so as to prevent adhesion of beads during drying. The conditions for the suspension polymerisation of the vinylbenzyl chloride based resins are presented in Table 5

TABLE 5

Conditions for the suspension polymerisation of VBC -co-St-co-DVB

| Resin Code | Monomer composition (vol. %) | Porogen (volumetric porogen: monomer) | Stirrer speed (rpm) | Yield (%) |
|---|---|---|---|---|
| R1 | 98% VBC 2% DVB | — | 500 | 53 |
| R2 | 37.5% VBC 62.5% DVB | Xylene (1:1) | 600 | 81 |
| R3 | 37.5% VBC 25.0% DVB 37.5% Styrene | 2-ethyl-hexanol (1:1.35) | 600 | 73 |

EXAMPLE 9

Reaction of 3-mercapto-1,2-propanediol with R2 (=FB205)

A 1.0 M solution of potassium tert-butoxide in 2-methyl-2-propanol (20 ml; 20 mmol) was added to a solution of 2-mercapto-1,2-propanediol (3.24 g; 30 mmol) in 1:1 methanol:THF (20 ml). The solution was stirred at ambient temperature for 5 min. before addition to a slurry of resin R2 (4 g; 10.67 mmol) in 1:1 methanol:THF (40 ml). The slurry was stirred at 50° C. for 16 hr. After cooling the reaction mixture the resin was filtered and washed with a 10:1:10 solution of methanol:acetic acid:water (300 ml). The resin was then washed successively with methanol (100 ml), acetone (100 ml) and diethyl ether (100 ml). The resin was dried at 70° C. under high vacuum for 2 hrs.

EXAMPLE 10

Reaction of 3-mercapto-1,2-propanediol with R1=(FB206)

A 1.0 M solution of potassium tert-butoxide in 2-methyl-2-propanol (20 ml; 20 mmol) was added to a solution of 2-mercapto-1,2-propanediol (2.9 g; 27.7 mmol) in 1:2 methanol:THF (60 ml). The solution was stirred at ambient temperature for 5 min. before addition of resin R1 (3 g; 18.3 mmol). The slurry was heated to 55° C. for 16 hrs. After cooling the reaction mixture the resin was filtered and washed with a 10:1:10 solution of methanol:acetic acid: water (300 ml). The resin was then washed successively with 19:1 methanol:water (100 ml) and water (100 ml). The resin was dried at 70° C. at 0.1 mbar for 5 hrs.

EXAMPLE 11

Reaction of monotetrahydropyranyl thiodiethanol with R2 (=FB194)

A 1.0 M solution of potassium tert-butoxide in 2-methyl-2-propanol (16 ml; 16 mmol) was added to a solution of monotetrahydropyranyl thiodiethanol (4.4 g; 21.6 mmol) in THF (15 ml). The solution was stirred at ambient temperature for 15 min. before being added to a slurry of resin R2 (4 g; 10.8 mmol) in THF (5 ml). The reaction mixture was heated at 72° C. for 16 hr without stirring. The resin was filtered and washed successively with methanol, water, acetone and then methanol. The resin was dried at 70° C. under high vacuum for 2 hrs.

EXAMPLE 12

Cleavage of the tetrahydropyranyl Group from Example 11 (=FB194b)

The product of Example 11 (3.5 g) was added to a solution of PTSA (0.1 g) in benzyl alcohol (15 ml). The slurry was heated at 70° C. for 16 hr. Upon cooling, the slurry was filtered and the resin washed successively with chloroform, acetone and methanol. The resin was dried at 70° C. under high vacuum for 2 hr.

Figure 1:
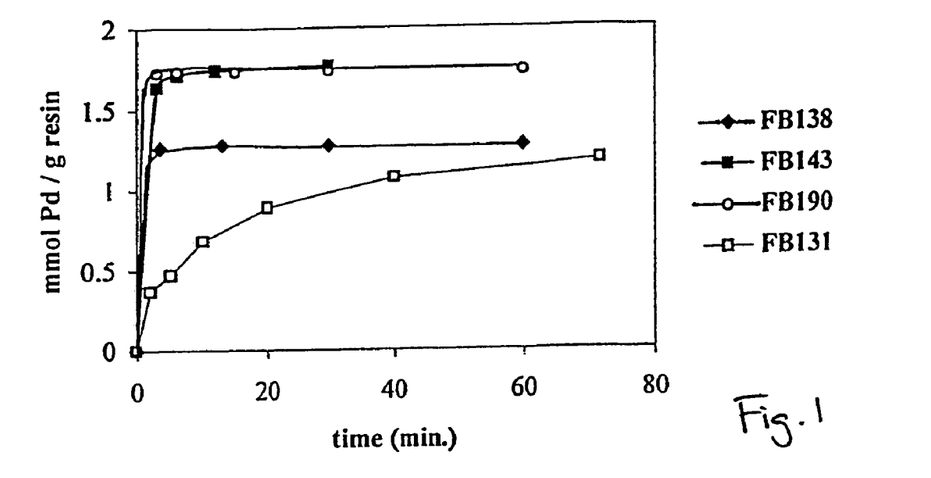
FIG. 1 is a graph illustrating the rate of uptake of Pd in a 6M hydrochloric acid solution by some examples of media according to the present invention.
Figure 2:
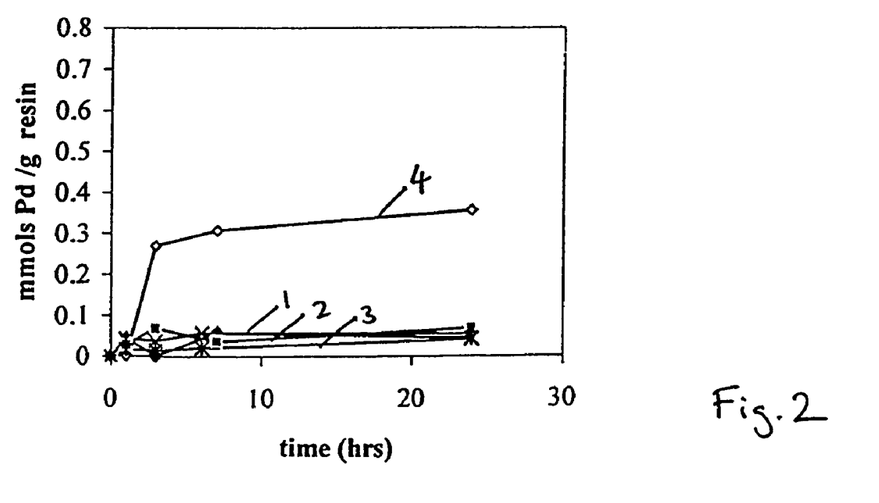
FIG. 2 is a graph illustrating the rate of uptake of Pd in a 6M hydrochloric acid solution by a media with limited hydrophilicity and also some examples of hydrophobic media not according to the present invention.

The media according to the invention effectively bind Pd from strong (about 6M) HCl solutions of mixed PGMs. The results obtained in preliminary binding tests from a simple solution of Pd, are shown in FIG. 1. Media FB 138, 143, 190 and 131 showed fast and complete Pd uptake. FIG. 2 shows some examples of media which are essentially hydrophobic (1, 2, 3); these show slow and incomplete Pd uptake. The better result in FIG. 2, relating to FB194b (4), is attributed to the medium having a single hydroxyl group substituent which provides some limited hydrophilicity.

Figure 3:
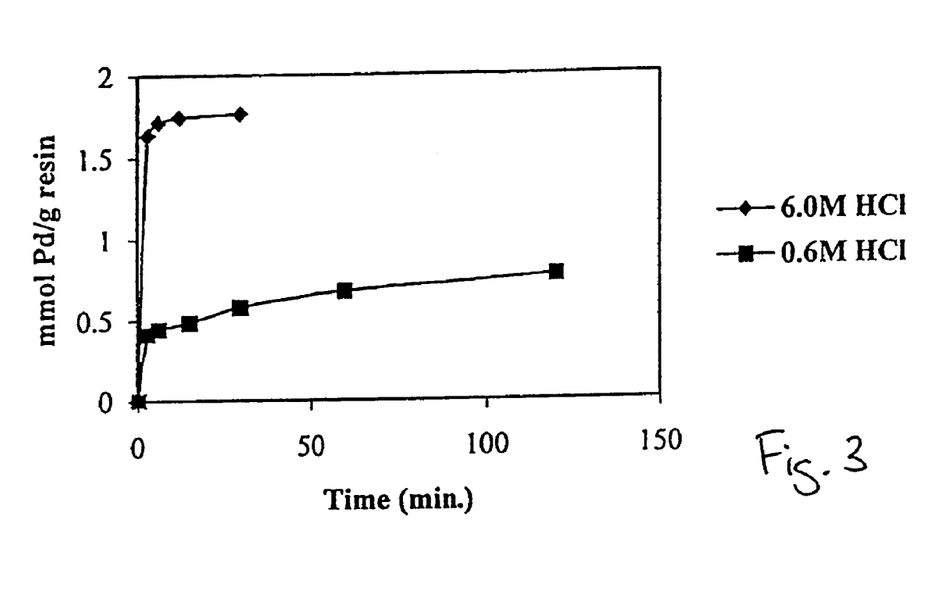
FIG. 3 is a graph comparing the rate of uptake of Pd from 0.6M and 6M hydrochloric acid solution by one example of a medium according to the present invention.
Figure 4:
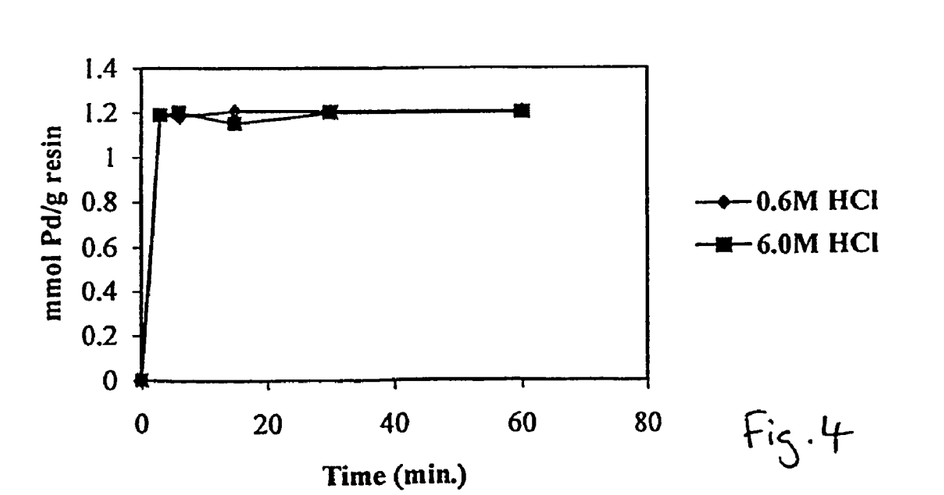
FIG. 4 is a graph comparing the rate of uptake of Pd from 0.6M and 6M hydrochloric acid solution by a further example of a medium according to the present invention.

Further tests have been carried out on media FB 143 and FB 138, at a lower HCl concentration of 0.6M as well as at 6M HCl. The results of these tests are plotted in FIGS. 3 and 4 respectively.

Tests have been carried out to assess both the total loading capacity of the media for Pd, and the rate of binding, the results of which are set out in Table 6 below. The $t_{1/2}$ value refers to the time taken for the media to reach half of its theoretical capacity based on the sulphur content.

TABLE 6

Pd loading capacities and $t_{1/2}$ for resins supporting monothioether ligands.

| Medium | mmol S/g | $t_{1/2}$ | Pd loading capacity (mmol Pd/g resin) | Molar ratio Pd:S |
|---|---|---|---|---|
| FB131 | 1.9 | 8 min. | 1.18 | 1:1.6 |
| FB138 | 1.9 | <3 min. | 1.27 | 1:1.5 |
| FB143 | 3.0 | <3 min. | 1.76 | 1:1.7 |
| FB190 | 2.9 | <3 min. | 1.73 | 1:1.7 |
| FB194b | 0.75 | 2 hrs | 0.35 | 1:2.1 |
| FB205 | 1.6 | <3 min. | 0.73 | 1:2.2 |
| FB206 | 4.2 | 45 min. | 2.19 | 1:1.9 |

The skilled person will realise that the speed of loading is important for practical use of Pd binding media, as is the total loading capacity, because this affects both the total quantity of medium required and throughput, and consequently the size of a plant and the capital cost thereof. For example, medium FB 206 is believed to have a total loading capacity which is a factor of approximately 5 greater than the commercial "Superlig" material. This may offer also the possibility of less washing required, which in turn lessens the amount of effluent produced thereby minimising environmental pollution.

Figure 5:
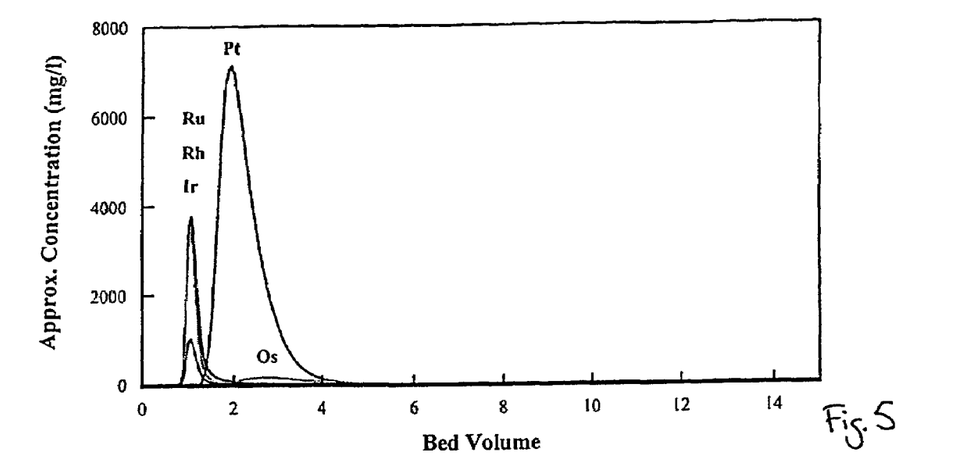
FIG. 5 is a chromatogram showing the separation of PGM in a mixed PGM solution using one of the media of FIG. 1.
Figure 6:
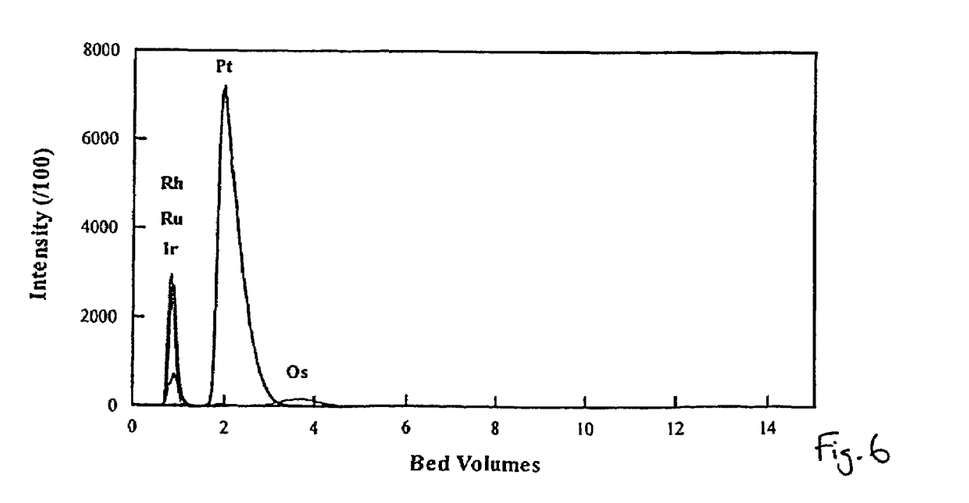
FIG. 6 is a chromatogram showing the separation of PGM in a mixed PGM solution using the medium of FIG. 4.

The preferred media of the invention were tested by loading 0.25 ml of a commercial mixed PGM process stream having the composition shown in Table 7, over a test chromatography column of 200 mm length and 5 mm id, and eluting with 6M HCl at a rate of in the case of FB131 0.375 ml/min and in the case of FB138 a rate of 0.385 ml/min, and the eluted stream is analysed for the PGM by ICP-ES The area of the peaks is not an accurate measure of the concentration of each metal ion but, is an approximation of the relative concentrations. The results are plotted in FIGS. 5 and 6. In both cases, no Pd could be detected in the eluted liquor. In FIG. 6, there is a Pt peak that overlaps only to a very small extent with Os, and is quite distinct from the mixed peak of Rh, Ru and Ir, the so-called "insoluble metals".

Figure 7:
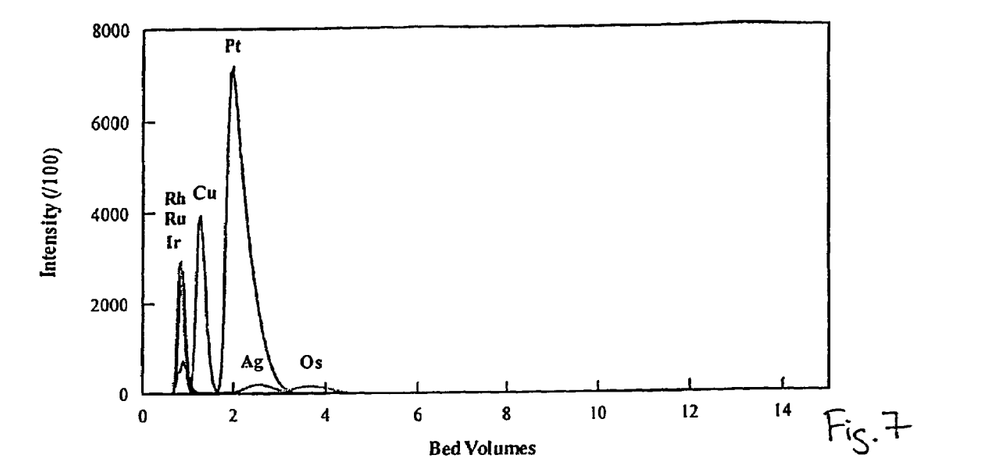
FIG. 7 is a chromatogram showing the separation of PGM in a mixed PGM solution which also include Ag and Cu using the medium of FIG. 4.

The data presented in FIG. 7 reproduce those of FIG. 6 but using a solution including base metal contamination in the form of Ag and Cu. There is some contamination of the Pt peak with Ag. It is postulated that the amount of sulphur on the medium affects the degree of retention of these metals.

Figure 8:
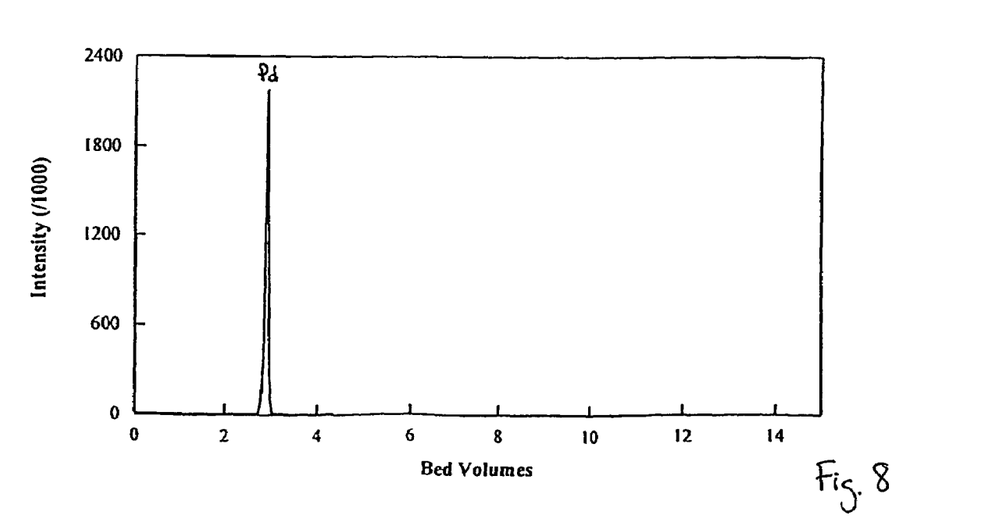
FIG. 8 shows the elution of substantially pure Pd using ammonia from the medium of FIG. 4.

Thus, the resin media of the invention are effective to remove Pd from mixed PGM solutions. The Pd may be recovered by elution with ammonia solution, or a solution of a nitrogen-containing species such as thiourea, ammonium thiocyanate or an amine, and FIG. 8 demonstrates the clean peak of recovered Pd that can be obtained from the resin media of the invention when extracting using aqueous ammonia.

EXAMPLE 13

Copolymerisation of glycidyl methacrylate and glycerol dimethacrylate Inside the Pores of Silica gel A solution of glycidyl methacrylate (15.0 g), glycerol dimethacrylate (0.3 g) and AIBN (0.3 g) in diethyl ether (170 ml) was added to Silica gel (50 g). The slurry was transferred to a baffled round-bottomed flask and the diethyl ether removed on a rotary evaporator under reduced pressure. The resulting free-flowing material was heated at 80° C. for a period of 6 hrs with constant mixing. The composite material was then washed with 250 ml of acetone and dried in a vacuum oven at 65° C. for 16 hrs.

EXAMPLE 14

Reaction of 3-mercapto-1,2-propanediol with poly(glycidyl methacrylate-co-glycerol dimethacrylate) Silica Gel Composite A 1 M Potassium tert-butoxide solution in tert-Butanol (7.5 ml) was added to a solution of 3-mercapto-1,2-propanediol (10 ml) in THF 60 ml and methanol (13 ml). This solution was added to a slurry of poly(glycidyl methacrylate-co-glycerol dimethacrylate) silica gel composite (50 g) in THF (100 ml) as prepared in Example 13. The reaction mixture was heated with constant stirring for 4 hrs at 65° C. The reaction mixture was filtered and washed successively with methanol (150 ml), 10% acetic acid (100 ml), water (150 ml), acetone (200 ml) and diethyl ether (100 ml). The composite was dried in a vacuum oven at 55° C. for 16 hrs.

EXAMPLE 15

Polymerisation of thiodiethanol monomethacrylate-co-poly(ethyleneglycol) methyl ether methacrylate [average Mn=1100]-co-glycerol dimethacrylate Inside the Pores of Silica Gel A solution of thiodiethanol monomethacrylate (7.16 g), glycerol dimethacrylate (0.191 g), poly(ethyleneglycol) methyl ether methacrylate [average Mn=1100] (2.19 g) and AIBN (0.191 g) in dichloromethane (75 ml) was added to Silica gel (24.55 g). The slurry was transferred to a baffled round-bottomed flask and the dichloromethane removed on a rotary evaporator under reduced pressure. The resulting free-flowing material was heated at 80° C. for a period of 6 hrs with constant mixing. The composite material was then extracted in a soxhlet apparatus with a dichloromethane/acetone mixture for 1 hr, filtered and dried in a vacuum oven at 80° C. for 1.5 hrs.

The skilled person will realise that many variations of the present invention herein particularly described can be accomplished without departing from the essential inventive scope thereof.

TABLE 7

| Composition of PGM concentrate | |
|---|---|
| Element | Concentration (g/l) |
| Ag | 0.643 |
| Al | <0.001 |
| As | 0.796 |
| Au | 0.248 |
| Ca | 0.036 |
| Co | 0.608 |
| Cr | 0.130 |
| Cu | 24.728 |
| Fe | 0.004 |
| Ir | 4.029 |
| Mg | 0.017 |
| Mn | 0.007 |
| Mo | <0.001 |
| Na | 1.457 |
| Ni | 32.217 |
| Os | 5.271 |
| Pb | 2.932 |
| Pd | 56.924 |
| Pt | 96.023 |
| Rh | 14.378 |
| Ru | 18.278 |
| S | 23.349 |
| Sb | <0.001 |
| Sc | 0.090 |
| Se | 0.376 |
| Sn | <0.001 |
| Te | <0.001 |
| Zn | <0.001 |

The invention claimed is:

1. A process for the separation of components from a solution comprising:
   (i) HCl and palladium (Pd) in admixture with other platinum group metals and base metals,
   (ii) HCl and palladium (Pd) in admixture with base metals, or
   (iii) HCl and palladium (Pd) in admixture with other platinum group metals, the process comprising the steps of passing said solution over a hydrophilic medium comprising thioether ligands bound to a solid cross-linked organic polymer matrix and separating the Pd from the other platinum group and/or base metals by retaining the Pd on the medium and eluting the other platinum group and/or base metals.

2. A process according to claim 1, wherein the retained Pd is recovered by eluting it with ammonia.

3. A process according to claim 1, wherein the thioether ligands comprise monothioether ligands.

4. A process according to claim 1, wherein the polymer comprises moieties selected from the group consisting of methacrylate moieties, styrene moieties, poly(ethylene glycol) moieties and any combination or mixture thereof.

5. A process according to 1, wherein the ligands are bound to the polymer matrix through functional groups selected from the group consisting of branched alkyl, unbranched alkyl, aryl, aralkyl, ether and ester groups and any combination thereof.

6. A process according to claim 5, wherein the or each functional group is substituted by hydroxyl groups.

7. A process according to claim 1, wherein the sulphur atom of the thioether group is substituted by an alkyl group of 1 to 6 carbon atoms.

8. A process according to claim 7, wherein the alkyl group of 1 to 6 carbon atoms is substituted by hydroxyl groups.

9. A process according to claim 1, wherein the chromatographic medium is in the form of a gel or a porous solid.

10. A process according to claim 1, wherein the chromatographic medium forms part of a composite chromatographic medium, the composite comprising a porous support, the pores of which support contain the medium.

11. A process according to claim 1, wherein the solution comprises Pd in admixture with two or more other metals.

12. A process according to claim 11, wherein the two or more other metals comprise platinum group metals.

13. A process according to claim 1, wherein the retained Pd is recovered by eluting it with a nitrogen-containing eluant.

* * * * *